United States Patent
Guo et al.

(10) Patent No.: US 10,958,168 B2
(45) Date of Patent: Mar. 23, 2021

(54) TECHNIQUES FOR CONTROLLING A SINGLE-INDUCTOR MULTIPLE-OUTPUT (SIMO) SWITCHED-MODE POWER SUPPLY (SMPS)

(71) Applicant: QUALCOMM Incorporated, San Diego, CA (US)

(72) Inventors: Linfei Guo, Daly City, CA (US); Chengwu Tao, Palo Alto, CA (US); Joseph Duncan, Carlsbad, CA (US); Xiaocheng Jing, San Jose, CA (US); Amir Parayandeh, San Francisco, CA (US); Justin Philpott, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/426,494

(22) Filed: May 30, 2019

(65) Prior Publication Data

US 2020/0381993 A1 Dec. 3, 2020

(51) Int. Cl.
*H02M 3/156* (2006.01)
*H02M 3/158* (2006.01)
*H02M 1/00* (2006.01)

(52) U.S. Cl.
CPC ............. *H02M 3/156* (2013.01); *H02M 1/00* (2013.01); *H02M 3/158* (2013.01); *H02M 3/1582* (2013.01); *H02M 2001/0009* (2013.01); *H02M 2001/009* (2013.01)

(58) Field of Classification Search
CPC . H02M 2001/0008; H02M 2001/0009; H02M 3/156; H02M 2003/1566; H02M 3/158; H02M 3/1582; H02M 3/1588
See application file for complete search history.

(56) References Cited

U.S. PATENT DOCUMENTS

| 8,581,562 | B2* | 11/2013 | Chen | H02M 3/158 |
| | | | | 323/222 |
| 8,659,280 | B2* | 2/2014 | de Nie | H02M 3/157 |
| | | | | 323/285 |
| 2009/0237854 | A1 | 9/2009 | Mok et al. | |
| 2011/0018515 | A1 | 1/2011 | McCloy-Stevens | |
| 2014/0217996 | A1* | 8/2014 | Peker | H02M 3/1582 |
| | | | | 323/271 |
| 2019/0146020 | A1* | 5/2019 | Banerji | G01R 31/013 |
| | | | | 323/282 |

OTHER PUBLICATIONS

International Search Report and Written Opinion—PCT/US2020/033078—ISA/EPO—dated Jul. 15, 2020.

* cited by examiner

*Primary Examiner* — Gary L Laxton
(74) *Attorney, Agent, or Firm* — Patterson & Sheridan, LLP

(57) ABSTRACT

Methods and apparatus for operating a switched-mode power supply (SMPS). One example method generally includes comparing a signal representative of an amount of current across an inductive element of the SMPS with at least three thresholds, selecting a configuration of the SMPS based on the comparison, and configuring the SMPS based on the selection.

18 Claims, 9 Drawing Sheets

TECHNIQUES FOR CONTROLLING A SINGLE-INDUCTOR MULTIPLE-OUTPUT (SIMO) SWITCHED-MODE POWER SUPPLY (SMPS)

TECHNICAL FIELD

Certain aspects of the present disclosure generally relate to electronic circuits and, more particularly, to circuits for power regulation.

BACKGROUND

A voltage regulator ideally provides a constant direct current (DC) output voltage regardless of changes in load current or input voltage. Voltage regulators may be classified as either linear regulators or switching regulators. While linear regulators tend to be small and compact, many applications may benefit from the increased efficiency of a switching regulator. A switching regulator may be implemented by a switched-mode power supply (SMPS), such as a buck converter or a boost converter.

Power management integrated circuits (power management ICs or PMIC) are used for managing the power requirement of a host system. A PMIC may be used in battery-operated devices, such as mobile phones, tablets, laptops, wearables, etc., to control the flow and direction of electrical power in the devices. The PMIC may perform a variety of functions for the device such as direct-current (DC)-to-DC conversion, battery charging, power-source selection, voltage scaling, power sequencing, etc.

SUMMARY

Certain aspects of the present disclosure generally relate to a method and apparatus for regulating an inductor current of a switched-mode power supply (SMPS).

Certain aspects provide a method for operating an SMPS. The method generally includes comparing a signal representative of an amount of current across an inductive element of the SMPS with at least three thresholds, selecting a configuration of the SMPS based on the comparison, and configuring the SMPS based on the selection.

Certain aspects provide an apparatus for operating an SMPS. The apparatus generally includes a comparison circuit configured to compare a signal representative of an amount of current across an inductive element of the SMPS with at least three thresholds, and a controller configured to select a configuration of the SMPS based on the comparison and configure the SMPS based on the selection.

Certain aspects provide an apparatus for operating an SMPS. The apparatus generally includes means for comparing a signal representative of an amount of current across an inductive element of the SMPS with at least three thresholds, means for selecting a configuration of the SMPS based on the comparison, and means for configuring the SMPS based on the selection.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

AN EXAMPLE DEVICE

Figure 1:
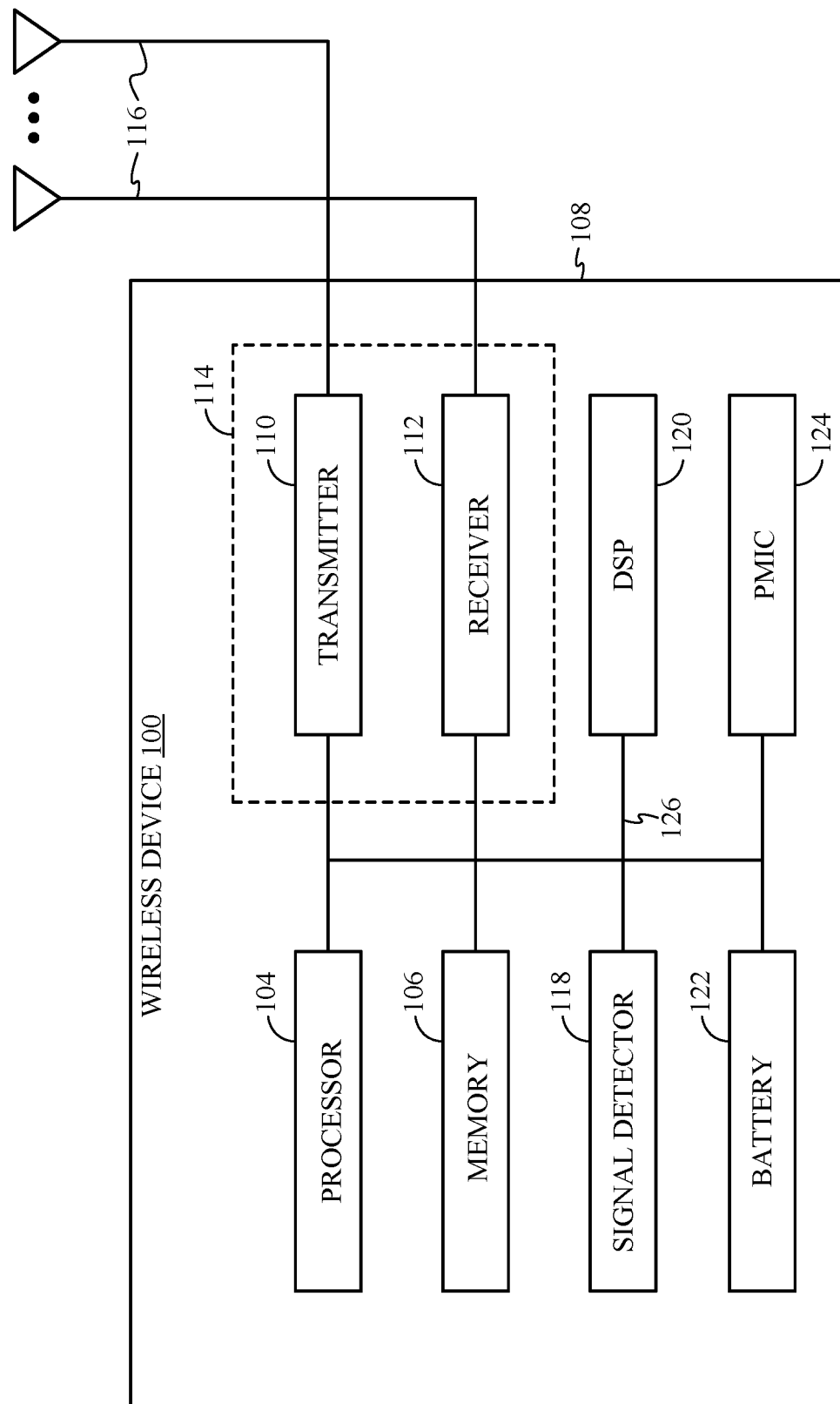
FIG. 1 is a block diagram of an example device including a power regulator, according to certain aspects of the present disclosure.

FIG. 1 illustrates a device 100. The device 100 may be a battery-operated device such as a cellular phone, a personal digital assistant (PDA), a handheld device, a wireless modem, a laptop computer, a tablet, a personal computer, etc. The device 100 is an example of a device that may be configured to implement the various systems and methods described herein.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106. The instructions in the memory 106 may be executable to implement the methods described herein.

The device 100 may also include a housing 108 that may include a transmitter 110 and a receiver 112 to allow transmission and reception of data between the device 100 and a remote location. The transmitter 110 and receiver 112 may be combined into a transceiver 114. A plurality of transmit antennas 116 may be attached to the housing 108 and electrically coupled to the transceiver 114. The device 100 may also include (not shown) multiple transmitters, multiple receivers, and multiple transceivers.

The device 100 may also include a signal detector 118 that may be used in an effort to detect and quantify the level of signals received by the transceiver 114. The signal detector 118 may detect such signals as total energy, energy per subcarrier per symbol, power spectral density and other signals. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In certain aspects, the PMIC 124 includes a voltage regulator which may be implemented using a single-inductor multiple-output (SIMO) switched-mode power supply (SMPS), as described in more detail herein.

The various components of the device 100 may be coupled together by a bus system 126, which may include a power bus, a control signal bus, and a status signal bus in addition to a data bus.

EXAMPLE SWITCHED-MODE POWER SUPPLY

A single-inductor multiple-output (SIMO) converter generally refers to a switched-mode power supply (SMPS) that may be used to provide multiple regulated voltages for multiple outputs using a single inductor. For example, a single-inductor dual-output (SIDO) converter may include two outputs. The first output of the SIDO converter may have a first voltage Vreg1, and the second output of the SIDO converter may have a second voltage Vreg2, which may be different than Vout1. Either of the output voltages Vreg1 and Vreg2 may be higher, lower, or equal to a supply voltage (e.g., battery voltage (Vbat)) of the SMPS. In other words, the two outputs of the SIDO converter may be two boost outputs if both outputs are greater than the supply voltage, two buck outputs if both outputs are less than the supply voltage, or one output may be a buck output and the other output may be a boost output. In some cases, the load currents associated with the two outputs may be anywhere between zero and a few amperes, and the amount of load current may be unknown to an SMPS controller used to control switches of the SMPS. The load currents associated with the outputs may also be uncorrelated with one another.

In a conventional pulse frequency modulation (PFM) operation of an SMPS, there may be three operation states. In a first state, the current across an inductive element of the SMPS ramps up, in a second state, the current across the inductive element ramps down, and in a third state, the current across the inductive element is zero (e.g., also referred to as a high-impedance (HiZ) state).

In some cases, the current across the inductive element may be ramping up and down as the SMPS transitions between the first state and the second state to regulate an output of the SMPS. After the output is sufficiently charged, the current across the inductive element ramps down to zero, and the SMPS enters the Hi-Z state. Conventional designs for controlling the inductor current rely on each state of the SMPS having a known inductor current profile. However, in some cases, the output voltages of the SMPS may be unpredictable. That is, it may not always be known whether the inductor current will be ramping up or down in each state of the SMPS when directing current to a specific output of the SMPS. Specifically, when the inductor is connected between the supply voltage (e.g., Vbat) and one of the outputs of the SMPS, the inductor current may either ramp up, ramp down, or be held constant. It may be unknown to the SMPS controller whether the inductor current will ramp up, ramp down, or be held constant prior to the inductor current being directed to the output.

Figure 2A:
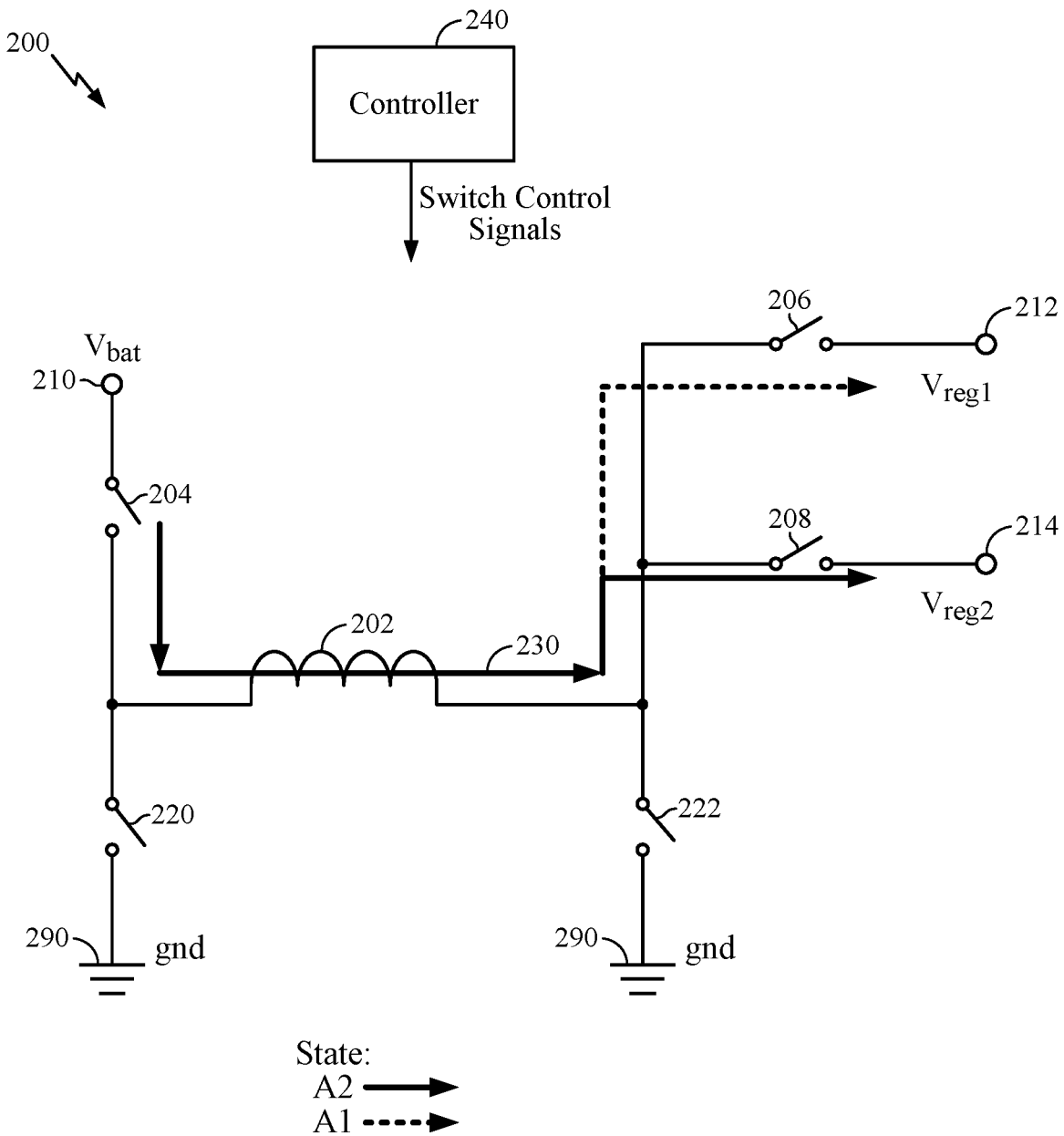
FIGS. 2A-2C are circuit diagrams of an example switched-mode power supply (SMPS) in three different states.
Figure 2B:
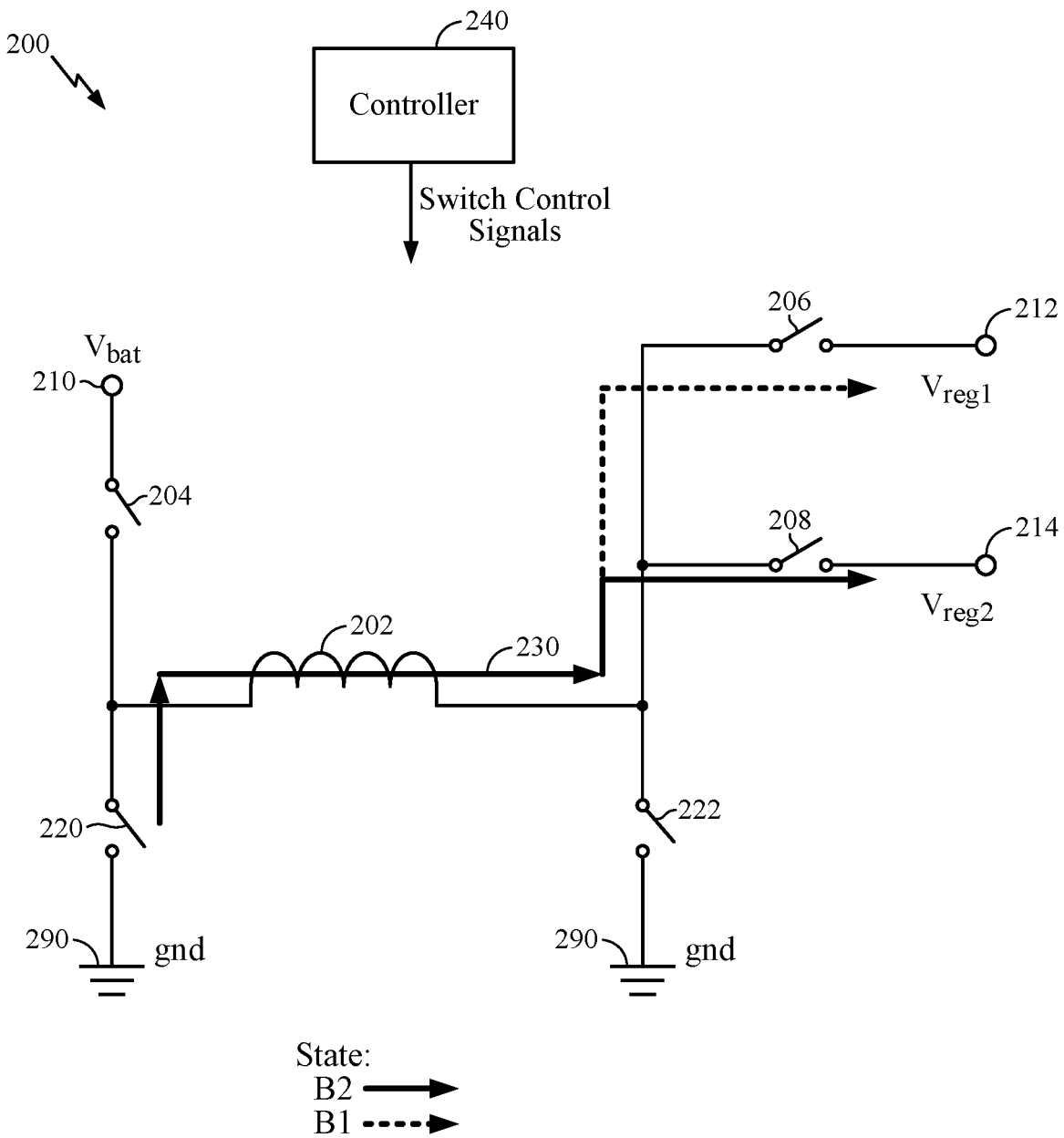
Figure 2C:
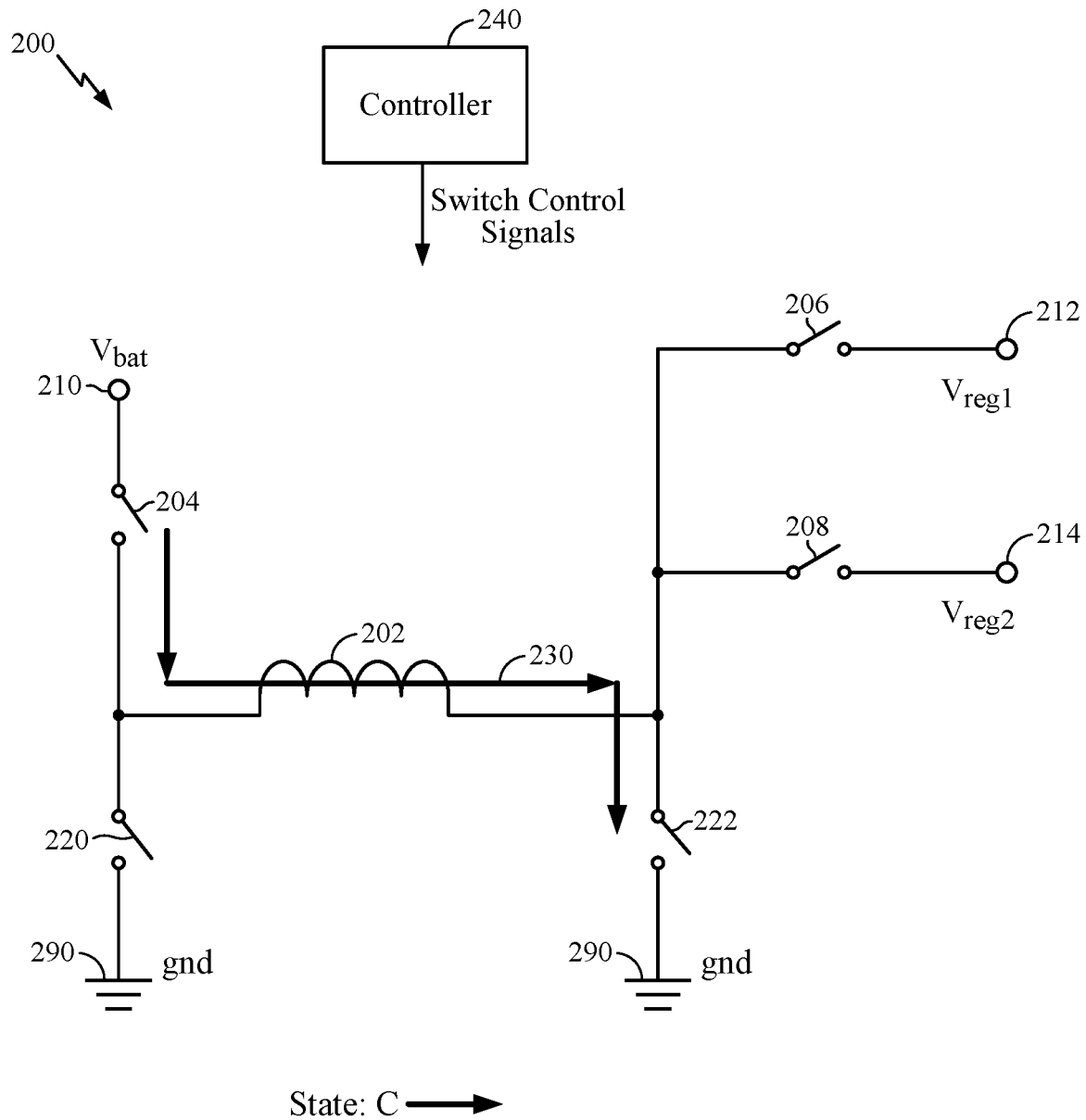

FIGS. 2A-2C are circuit diagrams of an example SMPS 200 in three different states. As illustrated in FIG. 2A, in the A1 and A2 states (collectively referred to as the A states), an inductive element 202 of the SMPS 200 is coupled between a supply node 210 (e.g., providing the supply voltage or battery voltage (Vbat)) and one of the output nodes 212, 214 of the SMPS. For example, in the A1 state for regulating Vreg1, switches 204, 206 are closed via a controller 240 (also referred to as an SMPS controller), coupling the inductive element 202 between the supply node 210 and the output node 212. In the A2 state for regulating Vreg2, the switches 204, 208 are closed via the controller 240, coupling the inductive element 202 between the supply node 210 and the output node 214. In other words, in the A1 state, the inductor current 230 is directed to the output node 212, and in the A2 state, the inductor current 230 is directed to the output node 214. While only two A states are shown for the SIDO of FIG. 2A, a person skilled in the art will recognize that there may be more than two A states when there are more than two SMPS outputs.

In the A states, the inductor current 230 may ramp up or down depending on whether the output voltage to which the inductive element 202 is coupled has a voltage that is below the supply voltage (e.g., Vbat) or above the supply voltage. For example, in the A1 state, if the voltage (Vreg1) at the output node 212 is below the supply voltage at the supply node 210, the inductor current ramps up, but if the voltage (Vreg1) is above the supply voltage, the inductor current ramps down. As described herein, it may be unknown to the controller 240 whether the inductor current 230 will ramp up or ramp down prior to the inductor current being directed to the output node 212.

As illustrated in FIG. 2B, during the B1 and B2 states (collectively referred to as the B states), the inductive element 202 of the SMPS 200 may be coupled between a reference potential node 290 (e.g., electric ground (gnd)) for the SMPS 200 and one of the output nodes 212, 214. For example, in the B1 state for regulating Vreg1, the switches 220, 206 are closed via the controller 240, coupling the inductive element 202 between the reference potential node and the output node 212. In the B2 state for regulating Vreg2 switches 220, 208 are closed via the controller 240, coupling the inductive element 202 between the reference potential node and the output node 214. In other words, in the B1 state, the inductor current 230 is directed to the output node 212, and in the B2 state, the inductor current 230 is directed to the output node 214. In the B states, the inductor current 230 ramps down since the inductive element 202 is coupled to the reference potential node through switch 220. While only two B states are shown for the SIDO of FIG. 2B, a person skilled in the art will recognize that there may be more than two B states when there are more than two SMPS outputs.

As illustrated in FIG. 2C, during a C state, the inductive element 202 of the SMPS 200 is coupled between the supply node 210 and the reference potential node by closing switches 204, 222. During the C state, the inductive element 202 is charging, and the inductor current ramps up.

As presented herein, in the A1 and A2 states, the inductor current may ramp up or down depending on whether the output voltage to which the inductor is coupled has a voltage that is below the supply voltage or above the supply voltage. In other words, the behavior of the inductor current 230 during the A1 and A2 states is unknown since it is unclear whether the inductor current ramps up or down during these states. Therefore, to regulate the inductor current 230, the SMPS may be configured to alternate between the B and C states during which the behavior of the inductor current is known. However, alternating between the B and C states places the SMPS in a forced buck-boost operating mode, which is inefficient.

Certain aspects of the present disclosure are directed to techniques for operating a multi-output converter to control the inductor current of the SMPS 200 in a manner that is more efficient than conventional implementations. Certain aspects enable the regulation of inductor current within certain predetermined thresholds without the specific knowledge of the relationship between the supply voltage and the output voltages of the SMPS.

Figure 3:
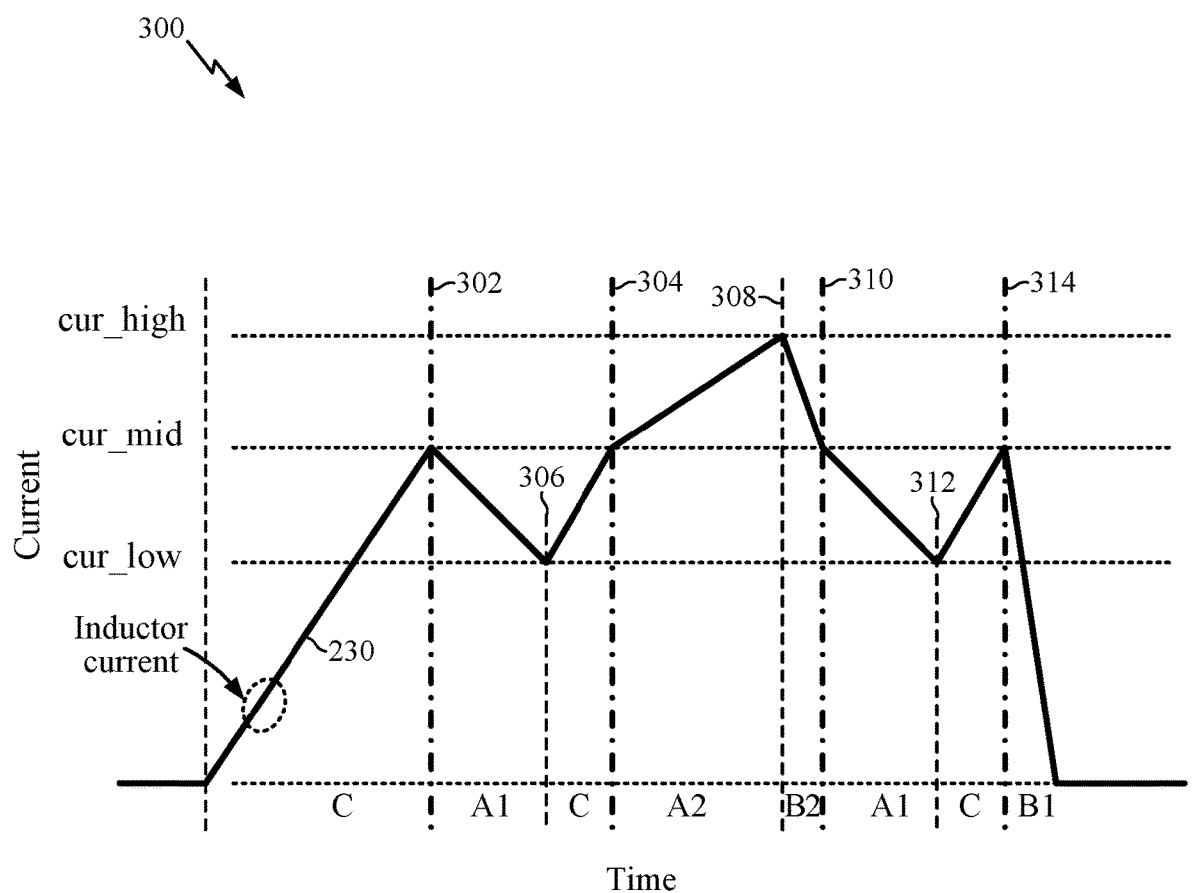
FIG. 3 is a graph illustrating an inductor current of an SMPS, in accordance with certain aspects of the present disclosure.

FIG. 3 is a graph 300 illustrating the inductor current 230 of the example SMPS 200, in accordance with certain aspects of the present disclosure. As illustrated, once the controller 240 detects that charge is to be provided to one of the outputs of the SMPS 200, the SMPS may be configured to enter state C, charging the inductive element 202 and ramping up the inductor current 230. In certain aspects, three different current thresholds (cur_low, cur_mid, cur_high) may be implemented. For example, the cur_low threshold may be lower than the cur_mid threshold, and the cur_mid threshold may be lower than the cur high threshold.

Once the inductor current 230 reaches the cur mid threshold, the SMPS is transitioned to one of the A states. For example, the SMPS may be transitioned to state A1 at time 302. Depending on whether Vreg1 is below or above the supply voltage of the SMPS 200, the inductor current 230 may ramp up or ramp down. For example, in the scenario depicted in FIG. 3, Vreg1 may be above the supply voltage, and Vreg2 may be below the supply voltage. Since Vreg1 is above the supply voltage, the inductor current 230 ramps down.

Once the inductor current 230 reaches the cur_low threshold at time 306, the SMPS may be configured in the C state to recharge the inductive element 202 and ramp up the inductor current 230. Once the inductor current 230 reaches the cur_mid threshold at time 304, the SMPS may be configured in state A2. In state A2, the inductor current 230 may ramp up if the Vreg2 at the output node 214 is below the supply voltage. Once the inductor current 230 reaches the cur high threshold at time 308, the SMPS may be configured in the B2 state, ramping down the inductor current 230 while continuing to direct the inductor current 230 to the output node 214.

Once the inductor current 230 reaches the cur_mid threshold at time 310, the inductor current may be configured in the A1 state, directing the inductor current 230 to the output node 212 and ramping down the inductor current 230. Once the inductor current 230 reaches the cur_low threshold at time 312, the SMPS may be configured in the C state, recharging the inductive element 202 and ramping up the inductor current 230. When the controller 240 determines that Vreg1 and Vreg2 are properly regulated and no more charge is to be provided to the output nodes 212, 214 at time 314, the SMPS 200 may be configured in the B1 state to ramp down the inductor current 230 until the inductor current reaches zero, at which point the SMPS may be configured in the Hi-Z state as described herein.

In other words, once the inductor current reaches either the thresholds cur_high or cur_low, the controller 240 is able to determine that the inductor current 230 is either too high (e.g., is at the cur_high threshold) or too low (e.g., is at the cur_low threshold). If the inductor current 230 is too high, the controller 240 may transition the SMPS to one of the B states to ramp down the inductor current 230. If the inductor current 230 is too low, the controller 240 may transition the SMPS to the C state to ramp up the inductor current 230. Either way, the controller 240 regulates the inductor current 230 to stay within the boundaries set by the cur_low and cur_high thresholds.

Figure 4:
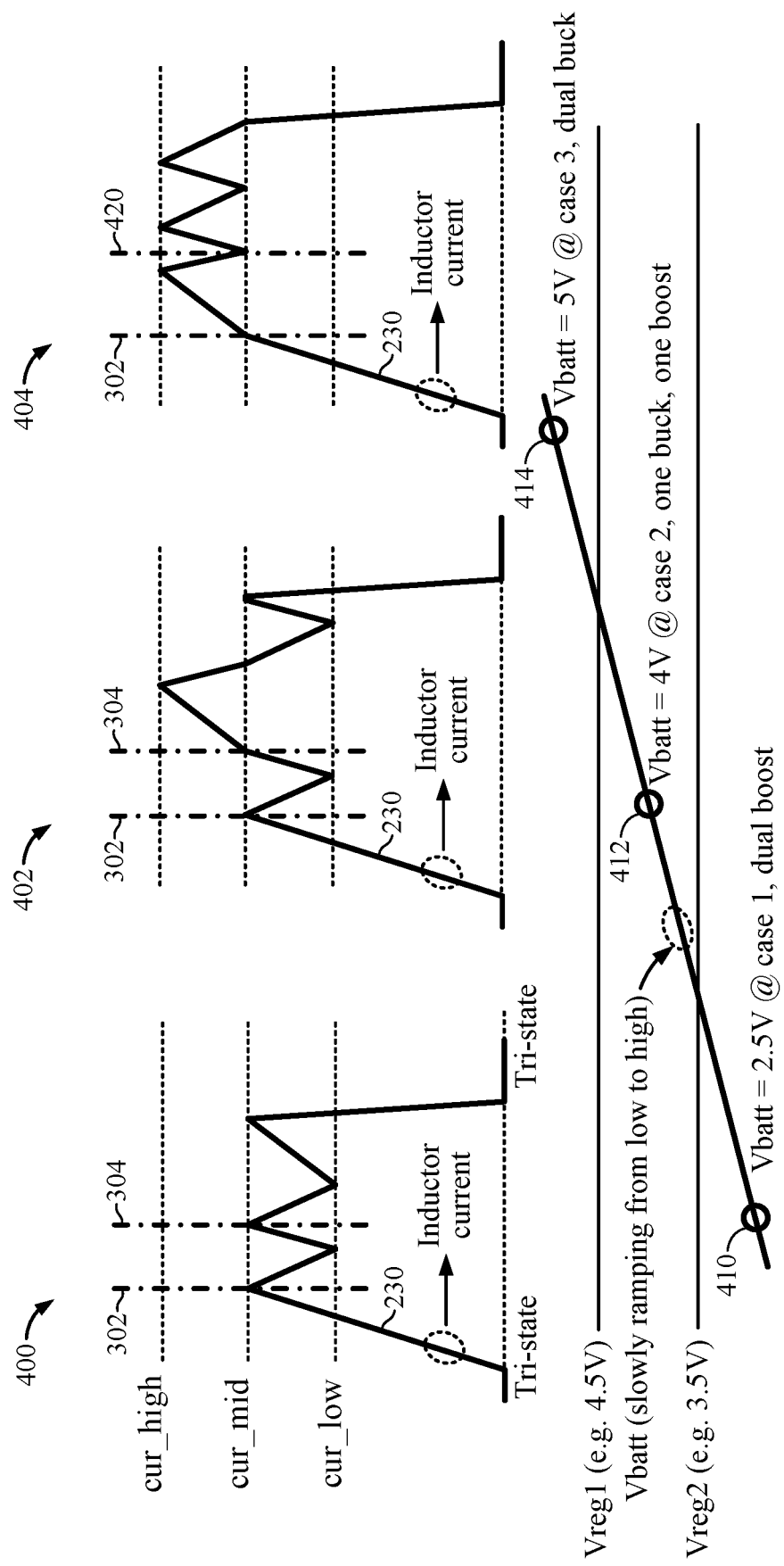
FIG. 4 includes graphs illustrating an inductor current of an example SMPS in different scenarios, in accordance with certain aspects of the present disclosure.

FIG. 4 includes graphs 400, 402, 404 illustrating the inductor current 230 in different scenarios, in accordance with certain aspects of the present disclosure. For example, at time 410, both Vreg1 and Vreg2 are below the supply voltage (e.g., Vbat). Graph 400 illustrates the inductor current 230 when both Vreg1 and Vreg2 are below the supply voltage. As illustrated, since both Vreg1 and Vreg2 are below the supply voltage (i.e., a dual boost scenario), regardless of whether the inductor current 230 is directed to the output node 212 or output node 214 after times 302, 304, the inductor current will ramp down. Therefore, the inductor current 230 will transition between the cur low and cur mid thresholds.

At time 412, Vreg1 is above the supply voltage, and Vreg2 is below the supply voltage. Graph 402 illustrates the inductor current 230 when Vreg1 is above the supply voltage and Vreg2 is below the supply voltage, and corresponds to the scenario depicted in FIG. 3. In other words, in this scenario, the inductor current 230 transitions between the cur_low and cur_mid thresholds and between the cur_mid and cur_high thresholds, as described herein.

At time 414, both Vreg1 and Vreg2 are above the supply voltage (e.g., Vbat). Graph 404 illustrates the inductor current 230 when both Vreg1 and Vreg2 are above the supply voltage. As illustrated, since both Vreg1 and Vreg2 are above the supply voltage (i.e., a dual buck scenario), regardless of whether the inductor current 230 is directed to the output node 212 or output node 214 after times 302, 420, the inductor current 230 is going to ramp up. Therefore, the inductor current 230 will transition between the cur_mid and cur_high thresholds.

Figure 5:
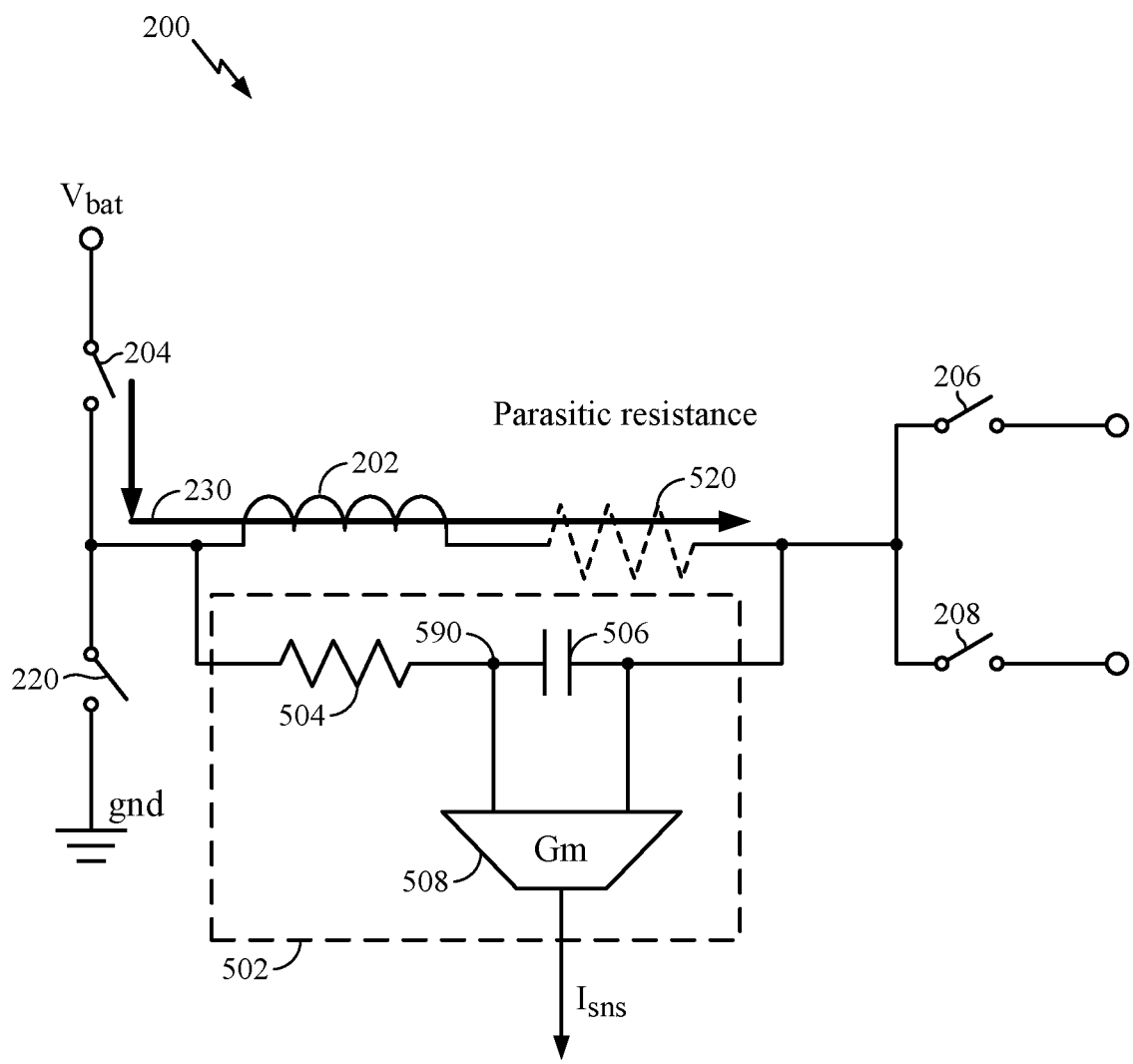
FIG. 5 illustrates an example current-sensing circuit for an SMPS, in accordance with certain aspects of the present disclosure.

FIG. 5 illustrates an example current-sensing circuit 502 for the SMPS 200, in accordance with certain aspects of the present disclosure. As illustrated, a resistive element 504 may be coupled between a first terminal of the inductive element 202 and a capacitive element 506 at node 590. The capacitive element 506 may be coupled between a second terminal of the inductive element 202 and the resistive element 504 at node 590. The voltage across the capacitive element 506 may be representative of the inductor current 230. A transconductance (Gm) circuit 508 may be implemented to sense the voltage across the capacitive element 506, and generate a sense current (Isns) that corresponds to the inductor current 230. The resistive element 520 represents the parasitic resistance of the inductive element 202 (also referred to as the equivalent series resistance or ESR).

Figure 6:
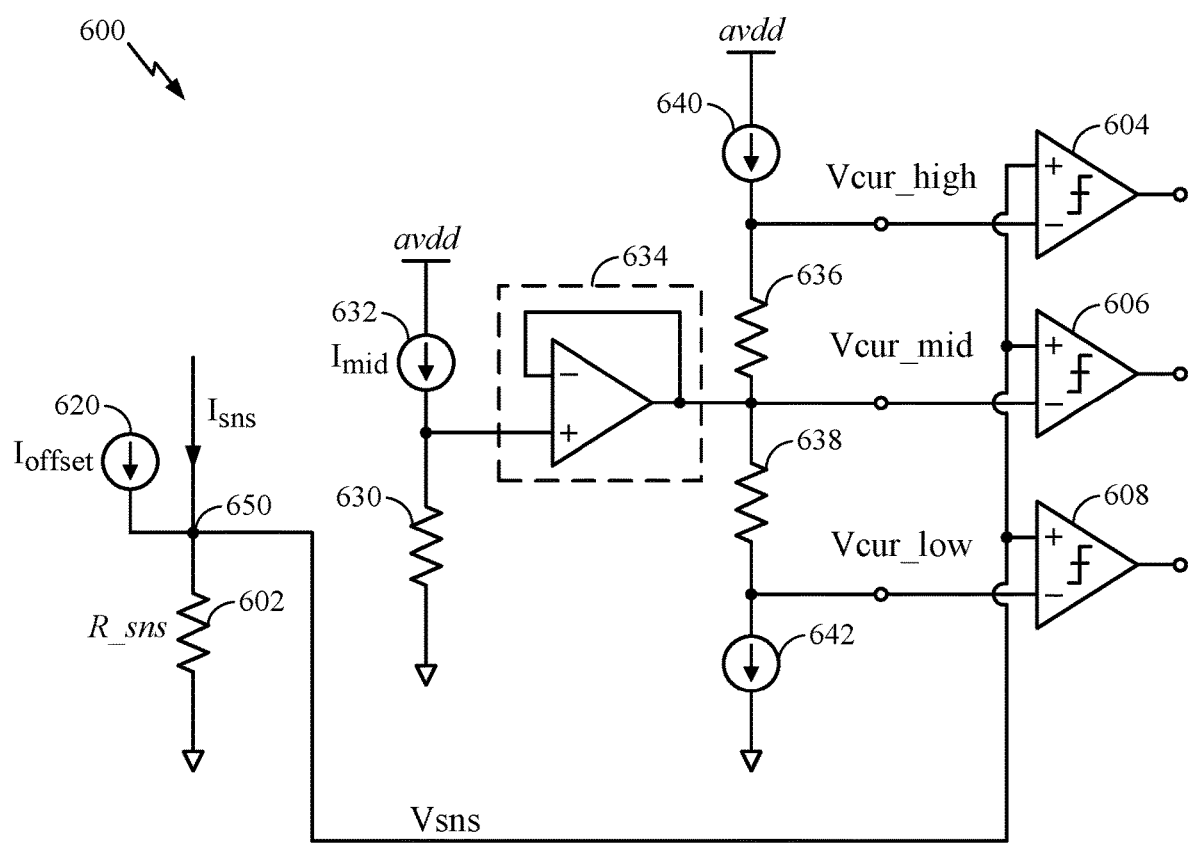
FIG. 6 is a comparison circuit for comparing a sense current to current thresholds, in accordance with certain aspects of the present disclosure.

FIG. 6 is a comparison circuit 600 for comparing the sense current Isns to the current thresholds described herein, in accordance with certain aspects of the present disclosure. As illustrated, Isns may be sourced to a sense resistive element (R_sns) 602 to generate a sense voltage (Vsns) at the positive input terminals of the comparators 604, 606, 608 (e.g., at node 650). In certain aspects, a current source 620 may be used to provide an offset current ($I_{offset}$) to node 650 to implement a voltage offset for Vsns.

Voltages Vcur_high, Vcur_mid, Vcur_low, representing respective current thresholds cur_high, cur_mid, cur_low, may be provided to respective negative input terminals of the comparators 604, 606, 608. For example, the comparison circuit 600 may include a current source 632 coupled to an analog voltage rail (avdd). The current source 632 may source a current ($I_{mid}$) to flow across a resistive element 630, generating a voltage at an input of a buffer 634 corresponding to Vcur_mid. The output of the buffer 634 is coupled to and provides Vcur_mid to the negative input terminal of the comparator 606. Moreover, the comparison circuit 600 may include current sources 640, 642 to source a current across the resistive element 636, 638, generating the voltage Vcur_high and Vcur_low. In other words, the voltage Vcur_low may be equal to the voltage Vcur_mid minus the voltage across the resistive element 638, and the voltage Vcur_high may be equal to the voltage Vcur_mid plus the voltage across the resistive element 636. Vcur_mid may be set by adjusting the current $I_{mid}$ or adjusting the resistance of the resistive element 630. Vcur_high and Vcur_low may be set by setting the resistances of the resistive element 636, 638. The outputs of the comparators 604, 606, 608 may indicate whether the inductor current 230 is equal to or greater than a respective one of the cur_low, cur_mid, and cur_high thresholds. The signals generated by the comparators 604, 606, and 608 may be input to the controller 240, based on which the controller 240 controls the SMPS 200 as described herein.

Figure 7:
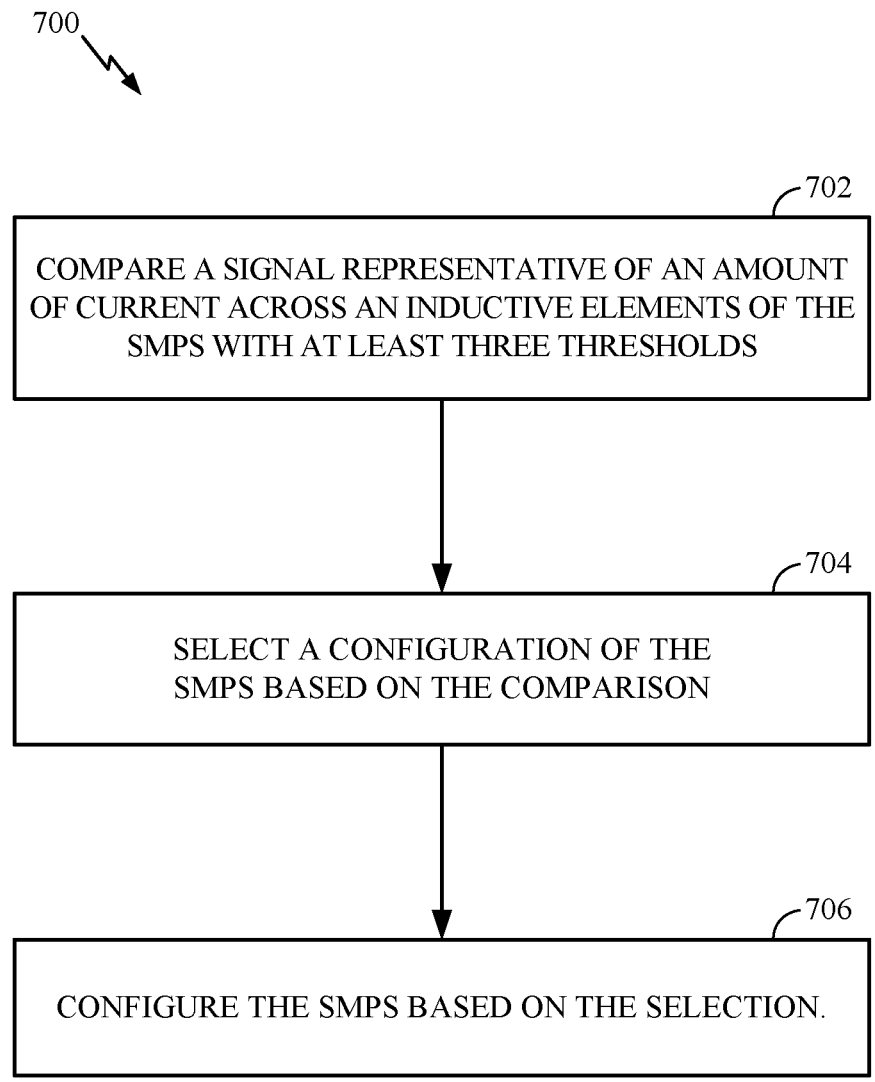
FIG. 7 is a flow diagram illustrating example operations for operating an SMPS, in accordance with certain aspects of the present disclosure.

FIG. 7 is a flow diagram illustrating example operations 700 for operating an SMPS, in accordance with certain aspects of the present disclosure. The operations 700 may be performed by a power supply system, such as the controller 240 and SMPS 200. For example, the SMPS may comprise a single inductor, but may have multiple outputs (e.g., a SIMO voltage regulator).

The operations 700 begin, at block 702, with the power supply system comparing a signal representative of an amount of current (e.g., inductor current 230) across an inductive element (e.g., inductive element 202) of the SMPS with at least three thresholds (e.g., cur_low, cur_mid, and cur_high thresholds). At block 704, the power supply system may select a configuration of the SMPS based on the comparison, and at block 706, configure the SMPS based on the selection.

In certain aspects, the at least three thresholds comprise a first threshold (e.g., cur_low threshold), a second threshold (e.g., cur_mid threshold), and a third threshold (e.g., cur_high threshold), the second threshold between the first threshold and the third threshold. The configuration may include a first configuration (e.g., one of the B states) in which the amount of current decreases if the signal representative of the amount of current is equal to or greater than the third threshold, and a second configuration (e.g., the C state) in which the amount of current increases if the signal representative of the amount of current is equal to or less than the first threshold.

In certain aspects, the configuring of the SMPS may include configuring the SMPS to direct the current to a first output of one or more outputs of the SMPS based on the selection. In certain aspects, prior to the current being directed to the first output, the inductive element may be coupled between a supply voltage node (e.g., supply node 210) of the SMPS and a reference potential node (e.g., reference potential node 290) of the SMPS. In certain aspects, the comparing of the signal representative of the amount of current with the at least three thresholds may include comparing the signal representative of the amount of current with a first threshold (e.g., cur_mid threshold) of the at least three thresholds. The configuration may be selected based on the comparison of the signal representative of the amount of current with the first current threshold. In certain aspects, the comparing of the signal representative of the amount of current with the at least three thresholds may also include comparing the signal representative of the amount of current with a current threshold of the at least three current thresholds. In this case, the operations 700 may also include reconfiguring the SMPS based on the comparison of the signal representative of the amount of current with the second threshold. In certain aspects, the reconfiguring of the SMPS may include coupling the inductive element between a supply voltage node of the SMPS and a reference potential node (e.g., reference potential node 290) of the SMPS if the second threshold (e.g., cur_low threshold) is less than the first threshold or coupling the inductive element between the reference potential node and one of the one or more outputs of the SMPS if the second threshold (e.g., cur_high threshold) is greater than the first threshold. In certain aspects, the one or more outputs comprise a plurality of outputs and the one of the plurality of outputs may include a second output of the SMPS that is a different than the first output.

In certain aspects, the second threshold (e.g., cur_low) is less than the first threshold. In certain aspects, the comparing of the signal representative of the amount of current with the at least three thresholds further includes performing another comparison of the signal representative of the amount of current with the first threshold (e.g., cur_mid threshold) of the at least three thresholds after coupling the inductive element between the supply voltage node and the reference potential node. The one or more outputs may include a plurality of outputs, and the configuring of the SMPS may involve configuring the SMPS to direct the current to a second output of the plurality of outputs based on the other comparison. In certain aspects, the second output may be the same or different than the first output. In certain aspects, the comparing of the signal representative of the amount of current with the at least three thresholds may also include comparing the signal representative of the amount of current with a third threshold (e.g., cur_high threshold) of the at least three thresholds after the directing of the current to the second output, and performing another reconfiguration of the SMPS based on the comparison of the signal representative of the amount of current with the third threshold. In certain aspects, the other reconfiguration may include coupling the inductive element between the reference potential node of the SMPS and one of the plurality of outputs. In certain aspects, the one of the plurality of outputs may include the second output.

In certain aspects, the second threshold (e.g., cur_high threshold) is greater than the first threshold, and the reconfiguring of the SMPS comprises coupling the inductive element between a reference potential node and one of the one or more outputs. In some cases, the one of the one or more outputs includes the first output. In certain aspects, the one or more outputs includes a plurality of outputs, and the comparing of the signal representative of the amount of current with the at least three thresholds includes performing another comparison of the signal representative of the amount of current with the first threshold (e.g., cur_mid threshold) after coupling the inductive element between the reference potential node and the one of the plurality of outputs. The configuring of the SMPS may involve configuring the SMPS to direct the current to a second output of the plurality of outputs based on the other comparison. In some cases, the comparing of the signal representative of the amount of current with the at least three thresholds also includes comparing the signal representative of the amount of current with a third threshold (e.g., cur_low threshold) of the at least three thresholds after the directing of the current to the second output. The operations 700 may also include performing another reconfiguration of the SMPS based on the comparison of the signal representative of the amount of current with the third threshold. In some cases, the other reconfiguration includes coupling the inductive element between a supply voltage node of the SMPS and the reference potential node of the SMPS.

In certain aspects, the operations 700 also include sensing the amount of current via a sense circuit (e.g., current-sensing circuit 502). In certain aspects, the comparing of the signal representative of the amount of current is performed via a comparison circuit (e.g., comparison circuit 600). In certain aspects, the sense circuit my include a capacitive element (e.g., capacitive element 506) and a resistive element (e.g., resistive element 504) coupled between a first terminal of the inductive element and the capacitive element, the capacitive element being coupled between a second terminal of the inductive element and the resistive element. The sense circuit may also include a transconductance circuit (e.g., transconductance circuit 508) having a first input coupled to a node (e.g., node 590) between the capacitive element and the resistive element, and a second input coupled to second terminal of the inductive element. In certain aspects, the comparison circuit may include a first comparator (e.g., comparator 604), a second comparator (e.g., comparator 606), and a third comparator (e.g., comparator 608), positive input terminals of the first comparator, the second comparator, and the third comparator being coupled to an output of the sense circuit. The comparison circuit may also include a first resistive element (e.g., resistive element 636) coupled between a negative input terminal of the first comparator and a negative input terminal of the second comparator, and a second resistive element (e.g., resistive element 638) coupled between the negative input terminal of the second comparator and a negative input terminal of the third comparator.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering. In certain aspects, means for selecting and means for configuring may be a controller, such as the controller 240. In certain aspects, means for comparing may be a comparison circuit, such as the comparison circuit 600.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-a-c-c, b-b, b-b-b, b-b-c, c-c, and c-c-c or any other ordering of a, b, and c).

The various illustrative logical blocks, modules and circuits described in connection with the present disclosure may be implemented or performed with discrete hardware components designed to perform the functions described herein. The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for operating a switched-mode power supply (SMPS), comprising:
   comparing a signal representative of an amount of current across an inductive element of the SMPS with at least three predetermined current threshold settings;
   selecting a configuration of the SMPS based on the comparison; and
   configuring the SMPS based on the selection, wherein:
   configuring the SMPS comprises configuring the SMPS to direct the current to a first output of one or more outputs of the SMPS based on the selection; and
   prior to the current being directed to the first output, the inductive element is coupled between a supply voltage node of the SMPS and a reference potential node of the SMPS by closing a first switch between the inductive element and the supply voltage node and closing a second switch coupled directly between the inductive element and the reference potential node.

2. The method of claim 1, wherein the at least three predetermined current threshold settings comprise a first threshold, a second threshold, and a third threshold, the second threshold being between the first threshold and the third threshold, wherein the configuration comprises:
   a first configuration in which the amount of current decreases if the signal representative of the amount of current is equal to or greater than the third threshold; and a second configuration in which the amount of current increases if the signal representative of the amount of current is equal to or less than the first threshold.

3. The method of claim 1, wherein:
the comparing of the signal representative of the amount of current with the at least three predetermined current threshold settings comprises comparing the signal representative of the amount of current with a first threshold of the at least three predetermined current threshold settings;
the configuration is selected based on the comparison of the signal representative of the amount of current with the first threshold;
the comparing of the signal representative of the amount of current with the at least three predetermined current threshold settings further comprises comparing the amount of current with a second threshold of the at least three predetermined current threshold settings; and
the method further comprises reconfiguring the SMPS based on the comparison of the signal representative of the amount of current with the second threshold.

4. The method of claim 3, wherein the reconfiguring of the SMPS comprises:
coupling the inductive element between the supply voltage node of the SMPS and the reference potential node of the SMPS if the second threshold is less than the first threshold; or
coupling the inductive element between the reference potential node and one of the one or more outputs of the SMPS if the second threshold is greater than the first threshold.

5. The method of claim 4, wherein the one or more outputs comprise a plurality of outputs, and wherein the one of the plurality of outputs comprises a second output of the SMPS that is different than the first output.

6. The method of claim 4, wherein:
the one or more outputs comprise a plurality of outputs;
the second threshold is less than the first threshold;
the comparing of the signal representative of the amount of current with the at least three predetermined current threshold settings further comprises performing another comparison of the signal representative of the amount of current with the first threshold of the at least three predetermined current threshold settings after coupling the inductive element between the supply voltage node and the reference potential node; and
the configuring of the SMPS comprises configuring the SMPS to direct the current to a second output of the plurality of outputs based on the other comparison.

7. The method of claim 6, wherein:
the comparing of the signal representative of the amount of current with the at least three predetermined current threshold settings further comprises comparing the amount of current with a third threshold of the at least three predetermined current threshold settings after the directing of the current to the second output; and
the method further comprises performing another reconfiguration of the SMPS based on the comparison of the signal representative of the amount of current with the third threshold.

8. The method of claim 7, wherein the other reconfiguration comprises:
coupling the inductive element between the reference potential node of the SMPS and one of the plurality of outputs.

9. The method of claim 8, wherein the one of the plurality of outputs comprises the second output.

10. The method of claim 4, wherein the second threshold is greater than the first threshold, and wherein the reconfiguring of the SMPS comprises coupling the inductive element between the reference potential node and one of the one or more outputs.

11. The method of claim 10, wherein the one of the one or more outputs comprises the first output.

12. The method of claim 11, wherein:
the one or more outputs comprise a plurality of outputs;
the comparing of the signal representative of the amount of current with the at least three predetermined current threshold settings further comprises performing another comparison of the signal representative of the amount of current with the first threshold after coupling the inductive element between the reference potential node and the one of the plurality of outputs; and
the configuring of the SMPS comprises configuring the SMPS to direct the current to a second output of the plurality of outputs based on the other comparison.

13. The method of claim 12, wherein:
the comparing of the signal representative of the amount of current with the at least three predetermined current threshold settings further comprises comparing the signal representative of the amount of current with a third threshold of the at least three predetermined current threshold settings after the directing of the current to the second output; and
the method further comprises performing another reconfiguration of the SMPS based on the comparison of the signal representative of the amount of current with the third threshold.

14. The method of claim 13, wherein performing the other reconfiguration comprises:
coupling the inductive element between the supply voltage node of the SMPS and the reference potential node of the SMPS.

15. An apparatus for operating a switched-mode power supply (SMPS), comprising:
a comparison circuit configured to compare a signal representative of an amount of current across an inductive element of the SMPS with at least three predetermined current threshold settings; and
a controller configured to:
select a configuration of the SMPS based on the comparison; and
configure the SMPS based on the selection, wherein:
the controller is configured to configure the SMPS by configuring the SMPS to direct the current to a first output of one or more outputs of the SMPS based on the selection; and
prior to the current being directed to the first output, the controller is configured to couple the inductive element between a supply voltage node of the SMPS and a reference potential node of the SMPS by controlling closing a first switch between the inductive element and the supply voltage node and controlling closing a second switch coupled directly between the inductive element and the reference potential node.

16. The apparatus of claim 15, further comprising a sense circuit configured to sense the amount of current and generate the signal representative of the amount of current.

17. The apparatus of claim 16, wherein the sense circuit comprises:
a capacitive element;
a resistive element coupled between a first terminal of the inductive element and the capacitive element, the capacitive element being coupled between a second terminal of the inductive element and the resistive element; and a transconductance circuit having:
   a first input coupled to a node between the capacitive element and the resistive element; and
   a second input coupled to the second terminal of the inductive element.

18. The apparatus of claim 16, wherein the comparison circuit comprises:
   a first comparator;
   a second comparator;
   a third comparator, positive input terminals of the first comparator, the second comparator, and the third comparator being coupled to an output of the sense circuit;
   a first resistive element coupled between a negative input terminal of the first comparator and a negative input terminal of the second comparator; and
   a second resistive element coupled between the negative input terminal of the second comparator and a negative input terminal of the third comparator.

* * * * *